(12) United States Patent
Okada et al.

(10) Patent No.: US 7,435,899 B2
(45) Date of Patent: Oct. 14, 2008

(54) CORRUGATED TUBE, APPARATUS FOR PERFORATING CORRUGATED TUBE AND METHOD OF PERFORATING CORRUGATED TUBE

(75) Inventors: Yoshitaka Okada, Makinohara (JP); Hiromi Sugimoto, Makinohara (JP); Kyoichi Yamamoto, Makinohara (JP); Hideyuki Kaneda, Makinohara (JP); Tomoyuki Kojima, Makinohara (JP)

(73) Assignee: Yazaki Corporation, Tokyo (JP)

( * ) Notice: Subject to any disclaimer, the term of this patent is extended or adjusted under 35 U.S.C. 154(b) by 329 days.

(21) Appl. No.: 10/561,441

(22) PCT Filed: Mar. 3, 2005

(86) PCT No.: PCT/JP2005/003624

§ 371 (c)(1),
(2), (4) Date: Dec. 20, 2005

(87) PCT Pub. No.: WO2005/088796

PCT Pub. Date: Sep. 22, 2005

(65) Prior Publication Data
US 2007/0102182 A1    May 10, 2007

(30) Foreign Application Priority Data
Mar. 3, 2004 (JP) .......................... P2004-058834
Apr. 22, 2004 (JP) .......................... P2004-126810

(51) Int. Cl.
*H01B 11/06* (2006.01)

(52) U.S. Cl. ....................................................... 174/36
(58) Field of Classification Search ................... 174/36, 174/102 R, 102 D, 68.3; 138/162
See application file for complete search history.

(56) References Cited

U.S. PATENT DOCUMENTS

| 3,694,563 A * | 9/1972 | Monds et al. ............... 174/97 |
| 3,877,831 A * | 4/1975 | Maroschak .................. 408/32 |
| 4,513,787 A * | 4/1985 | Hegler et al. ................ 138/166 |
| 6,034,329 A * | 3/2000 | Kawamura ............... 174/102 R |
| 6,078,009 A * | 6/2000 | Kawamura ............... 174/102 R |
| 6,843,276 B2 * | 1/2005 | Tadokoro .................... 138/121 |
| 6,938,645 B2 * | 9/2005 | Duarte et al. ................ 138/156 |
| 2002/0185190 A1 * | 12/2002 | Tadokoro .................... 138/156 |

FOREIGN PATENT DOCUMENTS

| JP | 2000-261932 A | * | 9/2000 |
| JP | 2001-260072 A |   | 9/2001 |
| JP | 2003-309918 A |   | 10/2003 |

\* cited by examiner

*Primary Examiner*—William H Mayo, III
(74) *Attorney, Agent, or Firm*—Sughrue Mion, PLLC

(57) ABSTRACT

A corrugated tube, an apparatus and method for perforating the corrugated tube. The corrugated tube includes a tubular body having large and small diameter portions and a longitudinal slit formed along a generating line of the tube body. The tube includes a communication hole formed generally in the large-diameter portions. A tube guide is provided in the apparatus for guiding the tubular body during the process of forming the perforations.

11 Claims, 12 Drawing Sheets

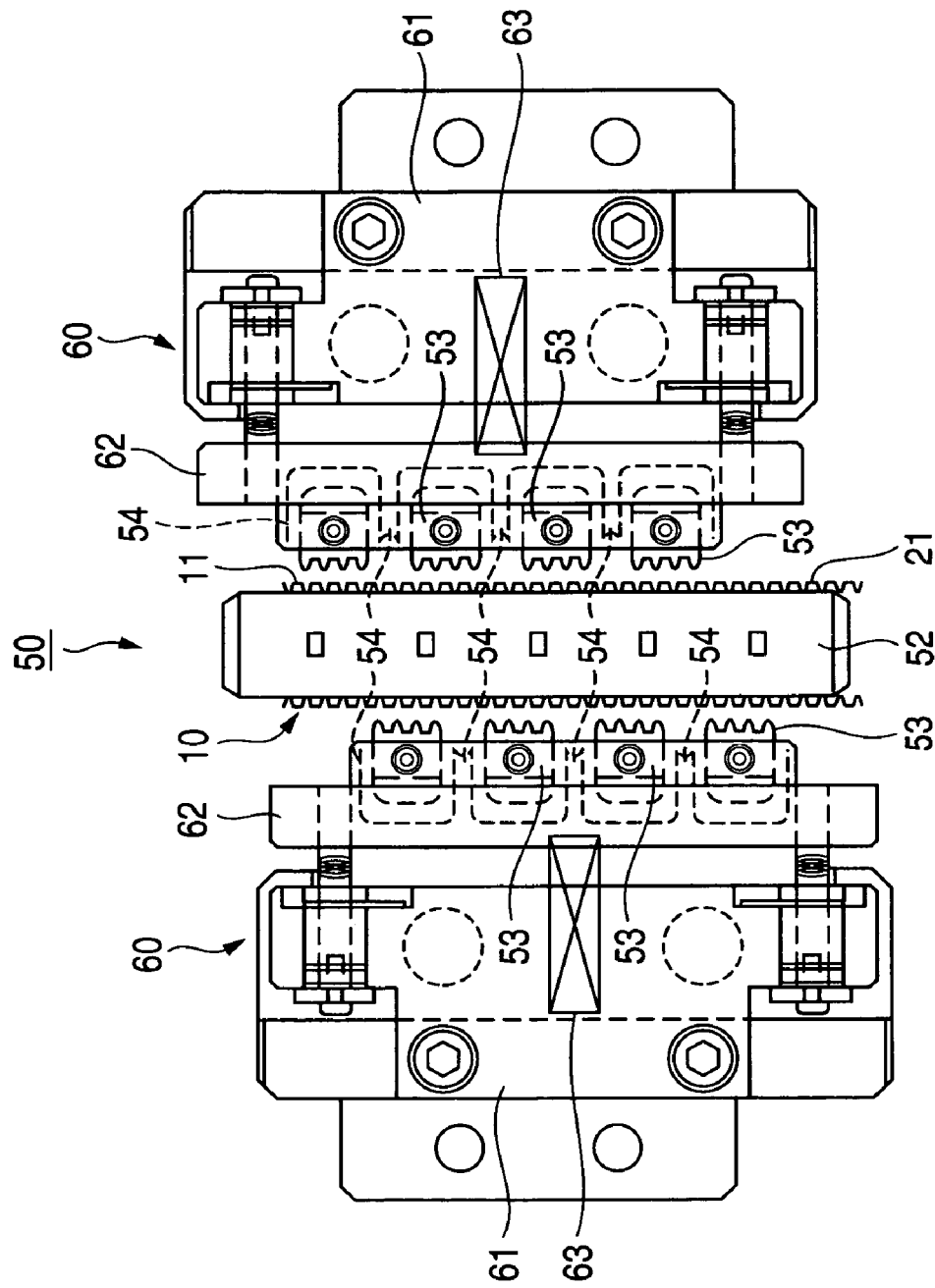

CORRUGATED TUBE, APPARATUS FOR PERFORATING CORRUGATED TUBE AND METHOD OF PERFORATING CORRUGATED TUBE

TECHNICAL FIELD

This invention relates to a corrugated tube with a slit, and a perforating apparatus and a perforating method therefor, and relates to a corrugated tube which can be fitted on a wire harness installed, for example, in an automobile and also to a corrugated tube perforating apparatus and a corrugated tube perforating method for forming communication holes in the corrugated tube.

BACKGROUND ART

There is known a corrugated tube with a slit, which is fitted on a wire harness to protect the same, and is installed (see, for example, Patent Literature 1).

As shown in FIGS. 13A and 13B, the corrugated tube 100 is made of a synthetic resin, and has a bellows-like cylindrical shape, and has annular root portions (smaller-diameter portions) 101 and annular ridge portions (larger-diameter portions) 102 arranged alternately at the same pitch in an axial direction, and the slit 103 is formed in the axial direction over an entire length thereof to provide a cut-shape.

Therefore, when such a corrugated tube 100 is to be fitted on a wire harness installed in an automobile, the corrugated tube is fitted on the wire harness laterally of the axial direction, using the slit 103 as an opening. Then, in some cases, an adhesive tape is roughly wound on an outer surface of the corrugated tube 100 to prevent the slit 103 from being opened. When the corrugated tube 100, receiving the wire harness therein, is to be installed, it is common to install the corrugated tube in such a manner that the slit 103 is disposed in the vicinity of a lowermost point so that water, intruding into the inside of the corrugated tube 100, and condensation water can be discharged through the slit 103.

Also, there is known an apparatus for forming a slit in a tube (see, for example, Patent Literature 2). FIG. 14 is a schematic perspective view showing a tube-slit forming apparatus disclosed in Patent Literature 2.

As shown in FIG. 14, in the tube-slit forming apparatus 110, the tube 111 is guided in an expanded manner by a rod-like member 112 passing through the tube 111, and is pushed out toward a cutter 114 by rotation of rollers 113, and a slit (not shown) is formed in the tube 111 by the cutter 114. Thus, the straight slit can be easily formed in the tube 111.
Patent Literature 1: JP-A-2003-309918 Publication (FIG. 3)
Patent Literature 2: JP-A-2001-260072 Publication (Pages 2 to 3, FIG. 1)

DISCLOSURE OF THE INVENTION

Problems that the Invention is to Solve

By the way, a wire harness is installed in various directions, for example, in a vehicle body, and therefore the corrugated tube 100, receiving the wire harness therein, is also installed in various directions, and is twisted. Therefore, there are occasions when the corrugated tube 100 is not always installed in such a manner that the slit 103 is disposed in the vicinity of the lowermost point, and when the slit 103 is disposed in a high position, water, intruding into the inside, and condensation water can not, in some cases, be discharged to the outside.

Furthermore, with the above tube-slit forming apparatus 110 shown in FIG. 14, only the straight slit can be formed in the tube 111.

This invention has been made in view of the above problems, and its object is to provide a corrugated tube capable of rapidly discharging water, such as water intruding into the inside and condensation water, to the outside, and a corrugated tube perforating apparatus and a corrugated tube perforating method which are capable of positively and efficiently forming a plurality of communication holes respectively in predetermined portions of a peripheral surface of a tube body.

Means for Solving the Problems

1) In order to solve the above problems, a corrugated tube of the present invention includes a tube body of a tubular shape having larger-diameter portions and smaller-diameter portions which are arranged alternately along the same axis, and a slit formed along a generating line of the tube body, and is characterized in that a communication hole, communicating an inside and outside of the tube body with each other, is formed in a peripheral surface of the tube body, and the communicating hole is formed by cutting part of the larger-diameter portion off over a predetermined length in a circumferential direction.

In the corrugated tube of this construction, for example, a wire harness or the like is inserted into the corrugated tube through the slit formed along the generating line of the tube body having the larger-diameter portions and the smaller diameter portions alternately arranged along the same axis. Usually, the corrugated tube, receiving the wire harness therein, is installed in such a manner that the slit is disposed at a lower side, but there arises the case where the slit cannot be disposed at the lower side because of the installation direction and a change of the direction. In such a case, the communication hole, communicating the inside and outside of the tube body with each other, is located in the vicinity of the lowermost point, and by doing so, water intruding into the corrugated tube, condensation water, etc., are discharged through this communication hole.

Furthermore, the communicating hole is formed by cutting part of the larger-diameter portion which has the outer peripheral surface and a vertical wall portion disposed between this larger-diameter portion and the smaller-diameter portion off over the predetermined length in the circumferential direction. Therefore, the communication hole, having a relatively large size for the diameter of the tube body of the corrugated tube, can be formed, and besides a high degree of freedom for the adjustment of the size of the communication hole can be secured.

2) Furthermore, the corrugated tube of the present invention is characterized in that the communication hole is formed at least in a portion of the peripheral surface of the tube body which is remotest from the slit.

In the corrugated tube of this construction, the communication hole is provided in the position remotest from the slit, and therefore when the corrugated tube is installed in such a manner that the slit faces upward, the communication hole is automatically located in the vicinity of the lowermost point.

3) Furthermore, the corrugated tube of the present invention is characterized in that a plurality of communication holes are provided, and the communication holes are arranged in a staggered manner in the peripheral surface of the tube body when the peripheral surface is shown in a developed view.

In the corrugated tube of this construction, the communication holes, communicating the inside and outside of the tube body with each other, are arranged in a staggered manner in the peripheral surface of the tube body when the peripheral surface is shown in a developed view, and therefore when the slit is not disposed at the lowermost point, any of the communication holes is disposed in the vicinity of the lowermost point. Therefore, water intruding into the corrugated tube, condensation water, etc., can be discharged.

4) Furthermore, the corrugated tube of the present invention is characterized in that the communication hole is formed to include a part of a vertical wall portion interconnecting the larger-diameter portion and the smaller-diameter portion.

In the corrugated tube of this construction, a radius portion which is a boundary portion between the smaller-diameter portion and the vertical wall portion remains even at a cut portion defining the communication hole, and therefore when a wire or the like is installed within the corrugated tube, the wire or the like can be prevented from being damaged. And besides, even when the outer peripheral surface of the corrugated tube is held in contact with some thing such for example as a winding tape, the communication hole will not be completely closed since it has a height, and therefore water intruding into the corrugated tube, condensation water, etc., can be discharged through that portion of the communication hole formed by notching the vertical wall portion.

5) Furthermore, the corrugated tube of the present invention is characterized in that the communication hole is formed to include a part of each of the vertical wall portions each formed between the larger-diameter portion and a respective one of the smaller-diameter portions disposed respectively on opposite sides of the larger-diameter portion in the circumferential direction.

In the corrugated tube of this construction, the radius portions which are the boundary portions each formed between the smaller-diameter portion and the vertical wall portion remain even at the cut portion defining the communication hole, and therefore when a wire or the like is installed within the corrugated tube, the wire or the like can be prevented from being damaged. And besides, even when the outer peripheral surface of the corrugated tube is held in contact with some thing such for example as a winding tape, the communication hole will not be completely closed since it has a height, and therefore water intruding into the corrugated tube, condensation water, etc., can be discharged through that portion of the communication hole formed by notching the vertical wall portion.

6) An apparatus of the present invention for perforating a corrugated tube, including a tube body of a tubular shape having larger-diameter portions and smaller-diameter portions which are arranged alternately along the same axis, and a slit formed along a generating line of the tube body, is characterized in that the apparatus comprises a slit former forming the slit in the tube body as the tube body of the corrugated tube is moved along the generating line of the tube body; a tube guide which is provided at a downstream side of the slit former in a moving direction of the tube body of the corrugated tube, and is fitted into the tube body and the slit to support the tube body in such a manner that the tube body is movable in a direction along the generating line; at least one pair of tube body feeders which are provided at opposite sides of the tube guide in the moving direction of the tube body, and abut against the tube body, supported on the tube guide, from the opposite sides of the tube body in the moving direction, and rotate, thereby moving the tube body along the tube guide; and a perforator forming a plurality of communication holes in predetermined portions of a peripheral surface of the tube body which is moved along the tube guide by the tube body feeders.

In the corrugated tube perforating apparatus of this construction, the tube guide is fitted into the tube body of the corrugated tube and the slit formed by the slit former, and therefore the tube body is smoothly moved along the tube guide by the tube body feeders without being rotated in the circumferential direction. Therefore, the perforator can positively and efficiently form the plurality of communication holes respectively in the predetermined portions of the peripheral surface of the tube body.

7) The corrugated tube perforating apparatus of the present invention is characterized in that the pair of tube body feeders are provided at each of an upstream side and a downstream side of the perforator in the moving direction of the tube body such that the two pairs of tube body feeders are provided in all.

In the corrugated tube perforating apparatus of this construction, the stable feeding can be achieved by the two pairs of tube body feeders, while taking expansion and contraction, etc., of the tube body of the corrugated tube into consideration, and the communication holes can be formed more positively and efficiently.

8) The corrugated tube perforating apparatus of the present invention is characterized in that retainers are provided at the vicinity of the perforator, respectively, and the retainers are brought into abutting engagement with the peripheral surface of the tube body to retain the tube body before perforating operation of the perforator.

In the corrugated tube perforating apparatus of this construction, the tube body of the corrugated tube can be positively positioned relative to the perforator by the retainers. Therefore, the perforator can positively and highly precisely form the communication holes respectively in the predetermined portions of the peripheral surface of the tube body without inviting a position deviation.

9) The corrugated tube perforating apparatus of the present invention is characterized in that the perforator and the retainers are driven by a cam mechanism.

In the corrugated tube perforating apparatus of this construction, the perforator and the retainers are moved in an operatively-associated manner by the cam mechanism which is a simple mechanism, and a sequence of operations, that is, the operation for retaining the tube body by the retainers and the operation for perforating the tube body by the perforator, are carried out smoothly and positively at the respective required timings.

10) The corrugated tube perforating apparatus of the present invention is characterized in that the perforators are provided in opposed relation to three portions of the peripheral surface of the tube body of the corrugated tube spaced almost 90 degrees from one another in a circumferential direction, and the three portions do not include a portion at which the slit is formed, and the perforators are arranged in offset relation in the moving direction of the tube body.

In the corrugated tube perforating apparatus of this construction, only one communication hole is formed on the same circumference at the peripheral surface of the tube body, and a plurality of communication holes will not be formed on the same circumference. Therefore, a local strength decrease of the tube body due to the formation of the communication holes is avoided.

11) A method of the present invention for perforating a corrugated tube, including a tube body of a tubular shape having larger-diameter portions and smaller-diameter portions which are arranged alternately along the same axis, and a slit formed along a generating line of the tube body, is characterized in that the method comprises forming the slit in the tube body by a slit former as the tube body of the corrugated tube is moved along the generating line of the tube body; fitting a tube guide into the tube body and the slit to support the tube body in such a manner that the tube body is movable along the generating line; moving the tube body along the tube guide by at least one pair of tube body feeders provided at opposite sides of the tube body in a moving direction of the tube body; and forming a plurality of communication holes in predetermined portions of a peripheral surface of the tube body by a perforator which is movable in a direction perpendicular to the moving direction of the tube body.

In this corrugated tube perforating method, the corrugated tube, having the slit, can be moved in a stable manner from the upstream side of the perforator to the downstream side of the perforator, and the plurality of communication holes can be positively and efficiently formed respectively in the predetermined portions of the peripheral surface of the tube body.

12) The corrugated tube perforating method of the present invention is characterized in that the tube body feeders abut against the tube body at two regions disposed at an upstream side and a downstream side of the perforator in the moving direction of the tube body, thereby moving the tube body.

In this corrugated tube perforating method, the corrugated tube can be moved in a more stable manner from the upstream side of the perforator to the downstream side of the perforator, and the plurality of communication holes can be more positively and efficiently formed.

Advantage Of The Invention

In the corrugated tube of the present invention, water can be discharged through the communication hole even when the slit is not located in the vicinity of the lowermost point as is different from the known art, in which water, intruding into a corrugated tube, is discharged only through a slit.

In the apparatus and method of the present invention for perforating the corrugated tube, the plurality of communication holes can be positively and efficiently formed respectively in the predetermined portions of the peripheral surface of the tube body of the corrugated tube having the slit.

BRIEF DESCRIPTION OF THE DRAWINGS

FIG. 12 is a plan view of FIG. 11.

DESCRIPTION OF THE REFERENCE NUMERALS AND SIGN

Figure 1:
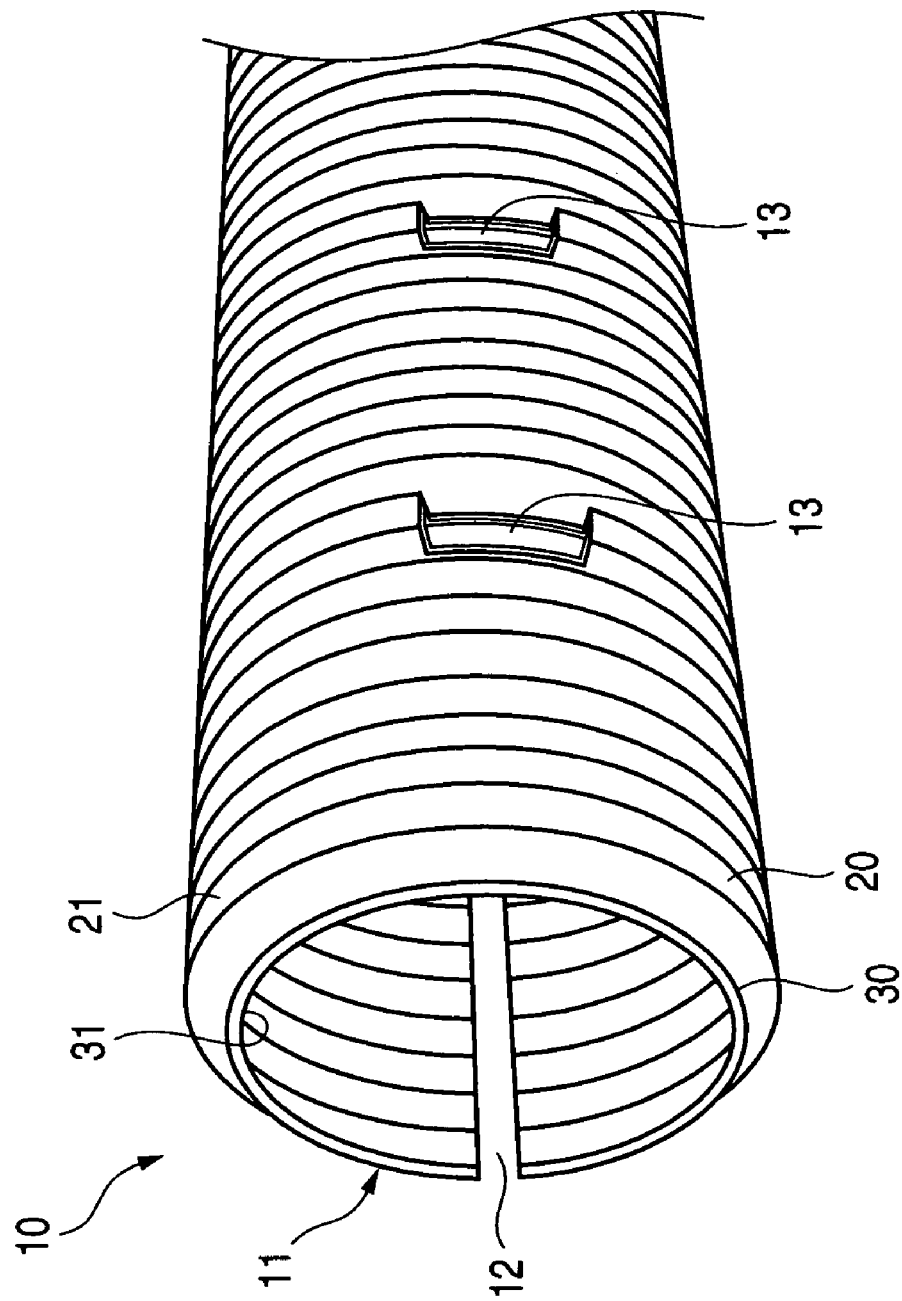
FIG. 1 is a perspective view showing an embodiment of a corrugated tube of the present invention.

10 corrugated tube
11 tube body
12 slit
13 communication hole
20 larger-diameter portion
21 outer peripheral surface (peripheral surface)
30 smaller-diameter portion
32 radius portion (boundary portion)
40 vertical wall portion
50 corrugated tube perforating apparatus
51 slit-forming cutter (slit former)
52 tube guide
53 retainer
54 perforating punch (perforator)
55 tube body feed gear
56 rotation shaft
57 transmitting mechanism
58 motor
60 cam mechanism
61 punch drive cam
62 retainer support portion
63 spring
A moving direction of tube body

BEST MODE FOR CARRYING OUT THE INVENTION

An embodiment of the present invention will now be described in detail with reference to the drawings.

Figure 2:
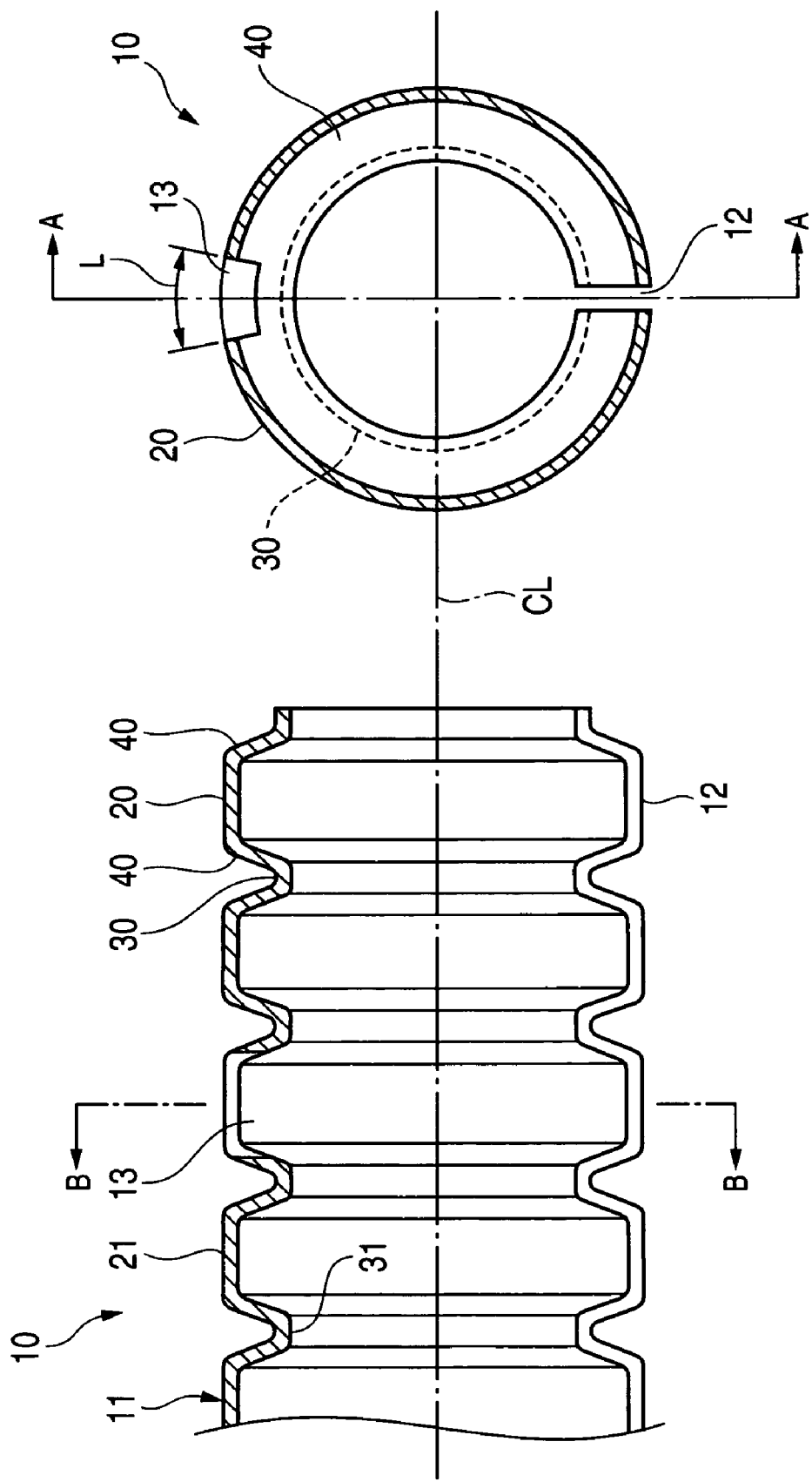
FIG. 2A is a cross-sectional view of the corrugated tube of the present invention cut in an axial direction thereof.
FIG. 2B is a cross-sectional view taken along the position B-B of FIG. 2A.
Figure 3:
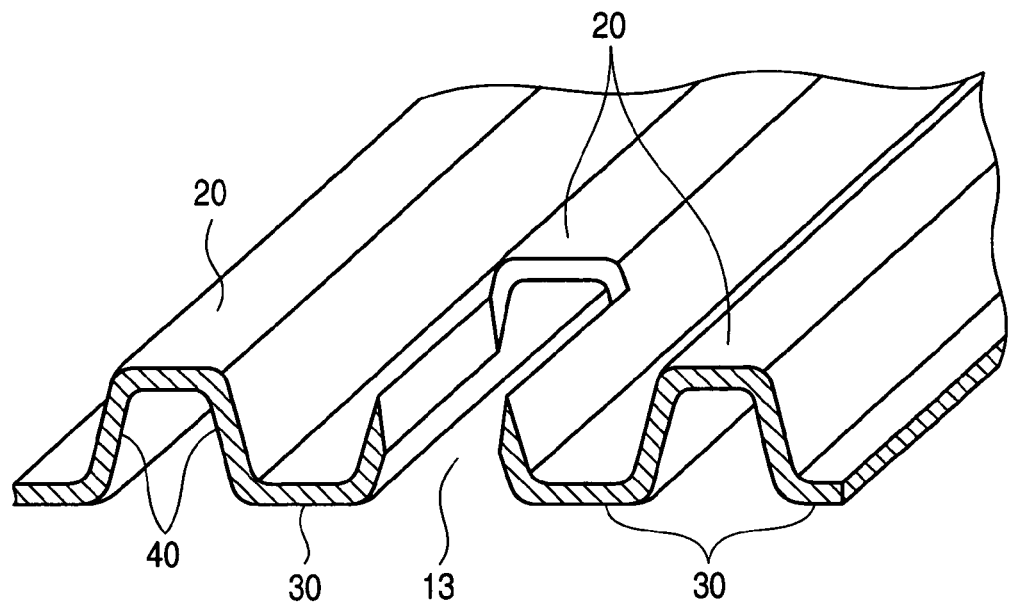
FIG. 3 is a cross-sectional view showing the shape of a communication hole.
Figure 5A:
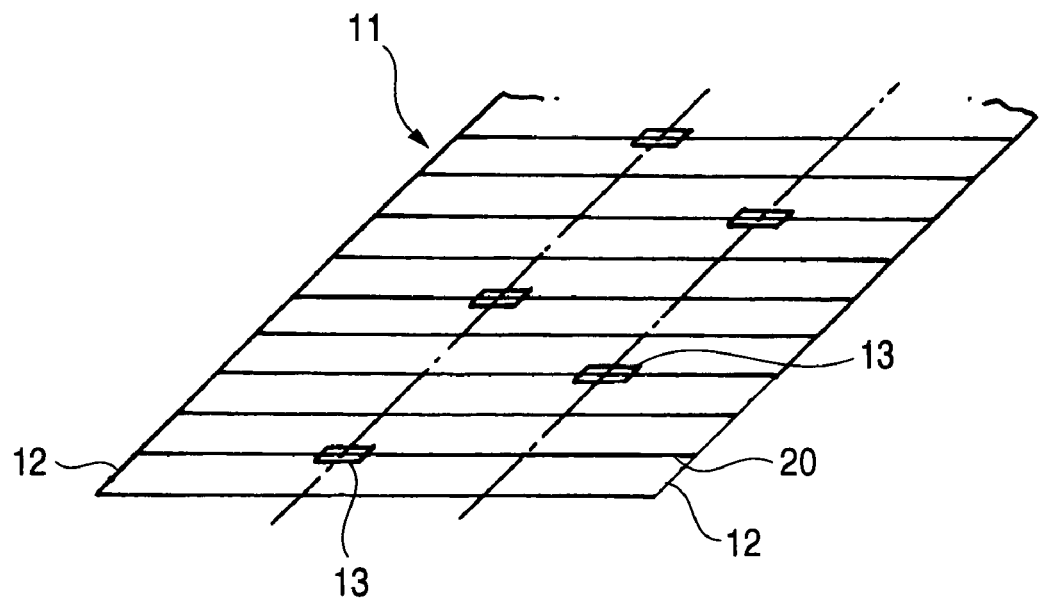
FIG. 5A is a developed view of a corrugated tube, showing the arrangement of two rows of communication holes formed therein.
Figure 5B:
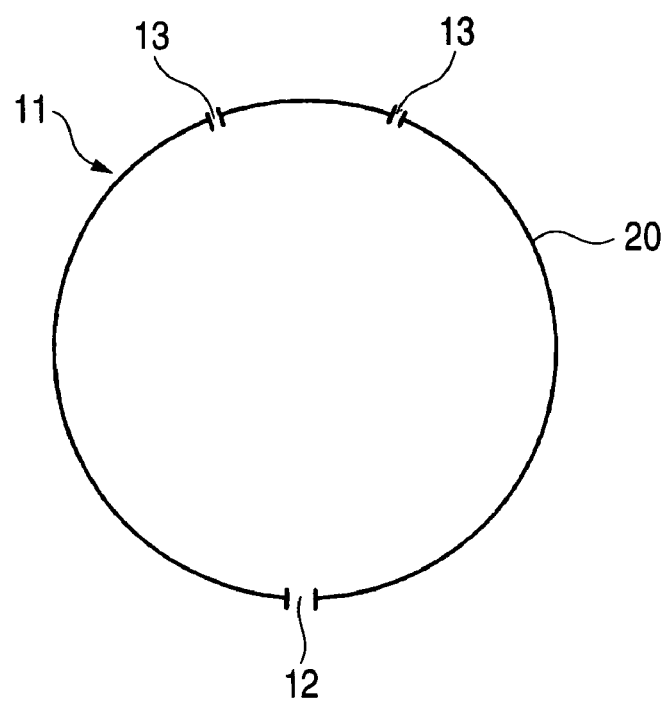
FIG. 5B is a cross-sectional view showing the arrangement of the communication holes.
Figure 6A:
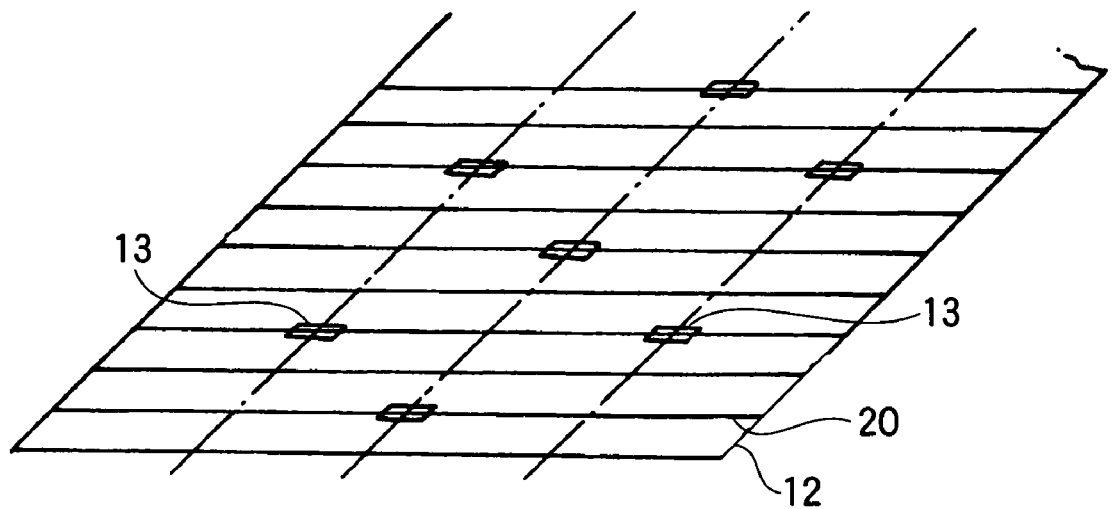
FIG. 6A is a developed view of a corrugated tube, showing the arrangement of three rows of communication holes formed therein.
Figure 6B:
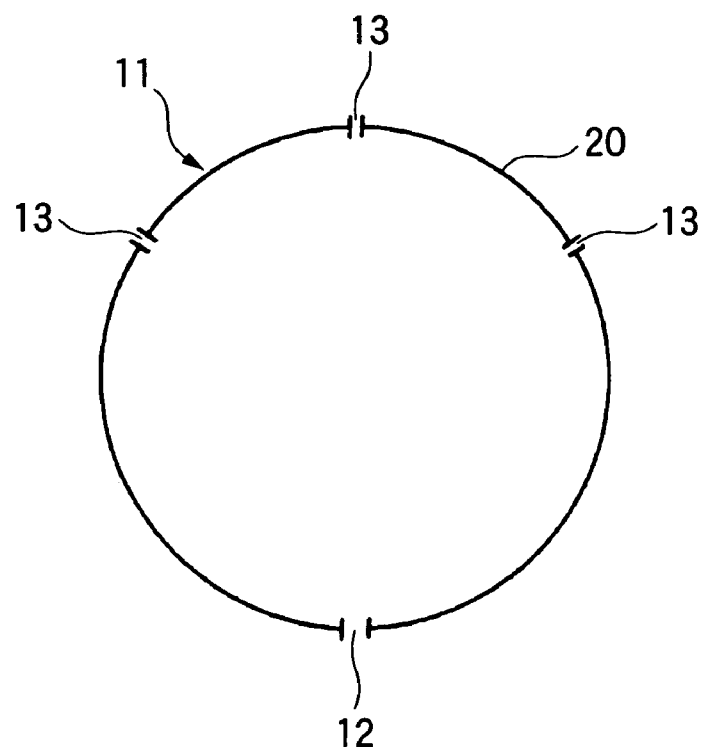
FIG. 6B is a cross-sectional view showing the arrangement of the communication holes.
Figure 7A:
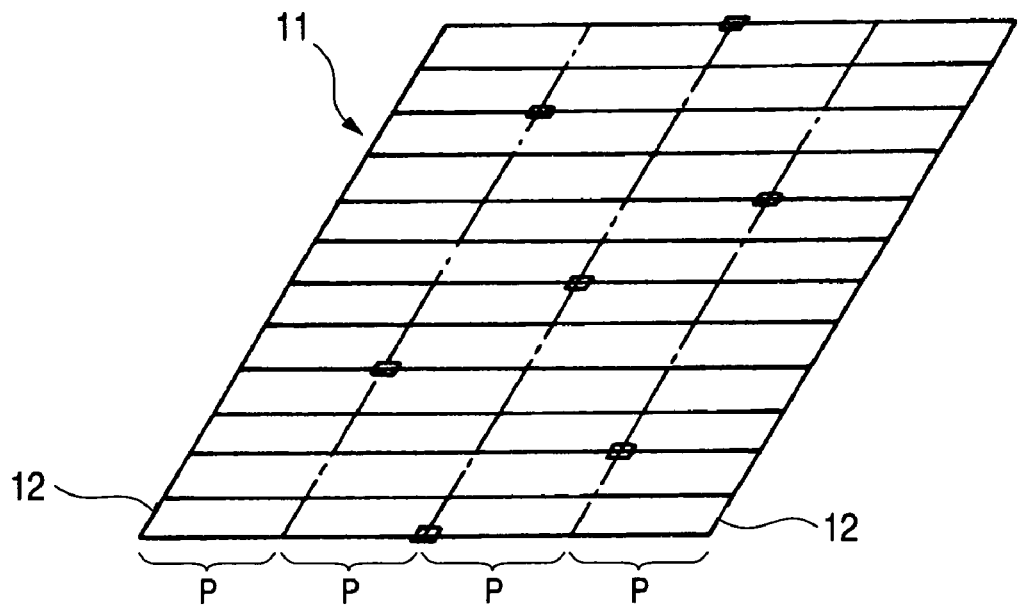
FIG. 7A is a developed view of a corrugated tube, showing another arrangement of three rows of communication holes formed therein.
Figure 7B:
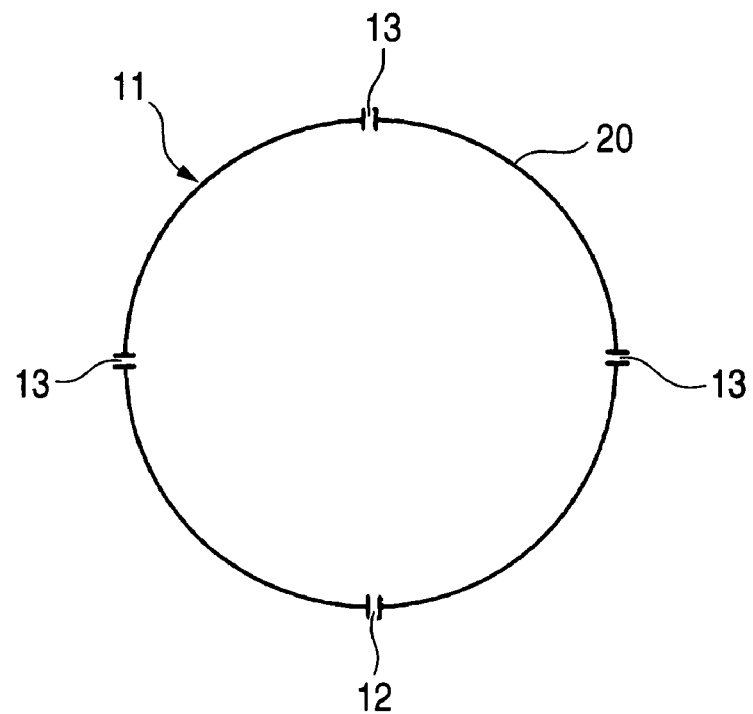
FIG. 7B is a cross-sectional view showing the arrangement of the communication holes.
Figure 8:
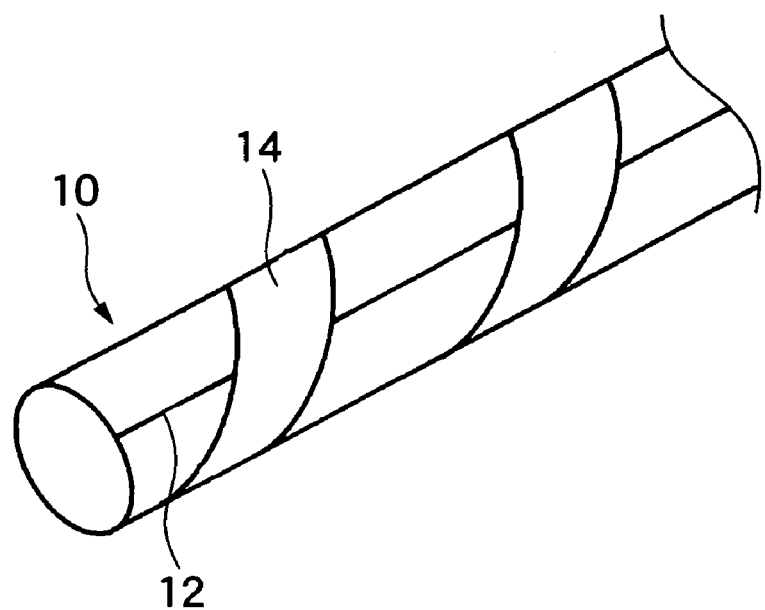
FIG. 8 is a perspective view showing the corrugated tube having an adhesive tape roughly wound on an outer peripheral surface thereof.
Figure 9:
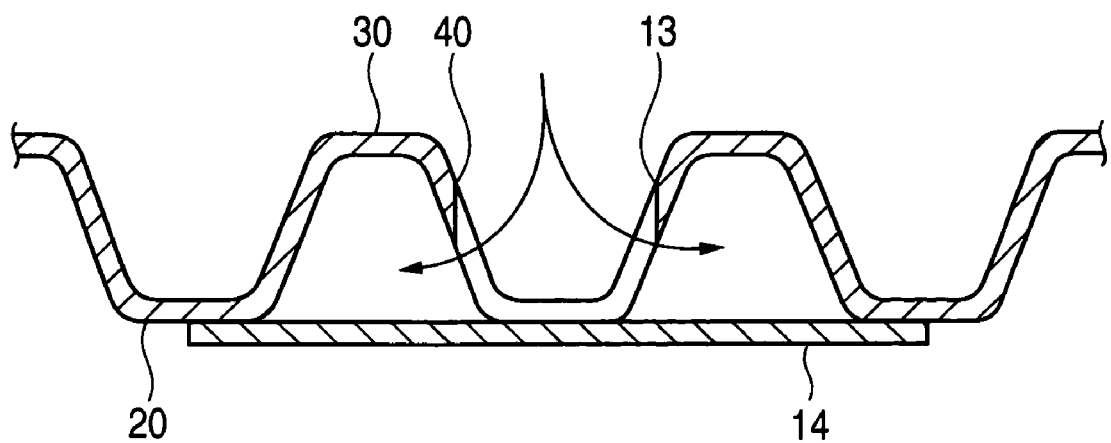
FIG. 9 is a cross-sectional view, showing the case where the adhesive tape is wound to be disposed over the communication hole.

FIG. 1 is a perspective view showing a first embodiment of a corrugated tube of the present invention, FIG. 2A is a cross-sectional view of the corrugated tube of the present invention cut in an axial direction thereof, FIG. 2B is a cross-sectional view taken along the position B-B of FIG. 2A, FIG. 3 is a cross-sectional view showing the shape of a communication hole, FIG. 5A is a developed view of a corrugated tube, showing the arrangement of two rows of communication holes formed therein, FIG. 5B is a cross-sectional view showing the arrangement of the communication holes, FIG. 6A is a developed view of a corrugated tube, showing the arrangement of three rows of communication holes formed therein, FIG. 6B is a cross-sectional view showing the arrangement of the communication holes, FIG. 7A is a developed view of a corrugated tube, showing another arrangement of three rows of communication holes formed therein, FIG. 7B is a cross-sectional view showing the arrangement of the communication holes, FIG. 8 is a perspective view showing the corrugated tube having an adhesive tape roughly wound on an outer peripheral surface thereof, and FIG. 9 is a cross-sectional view, showing the case where the adhesive tape is wound to be disposed over the communication hole.

Figure 10:
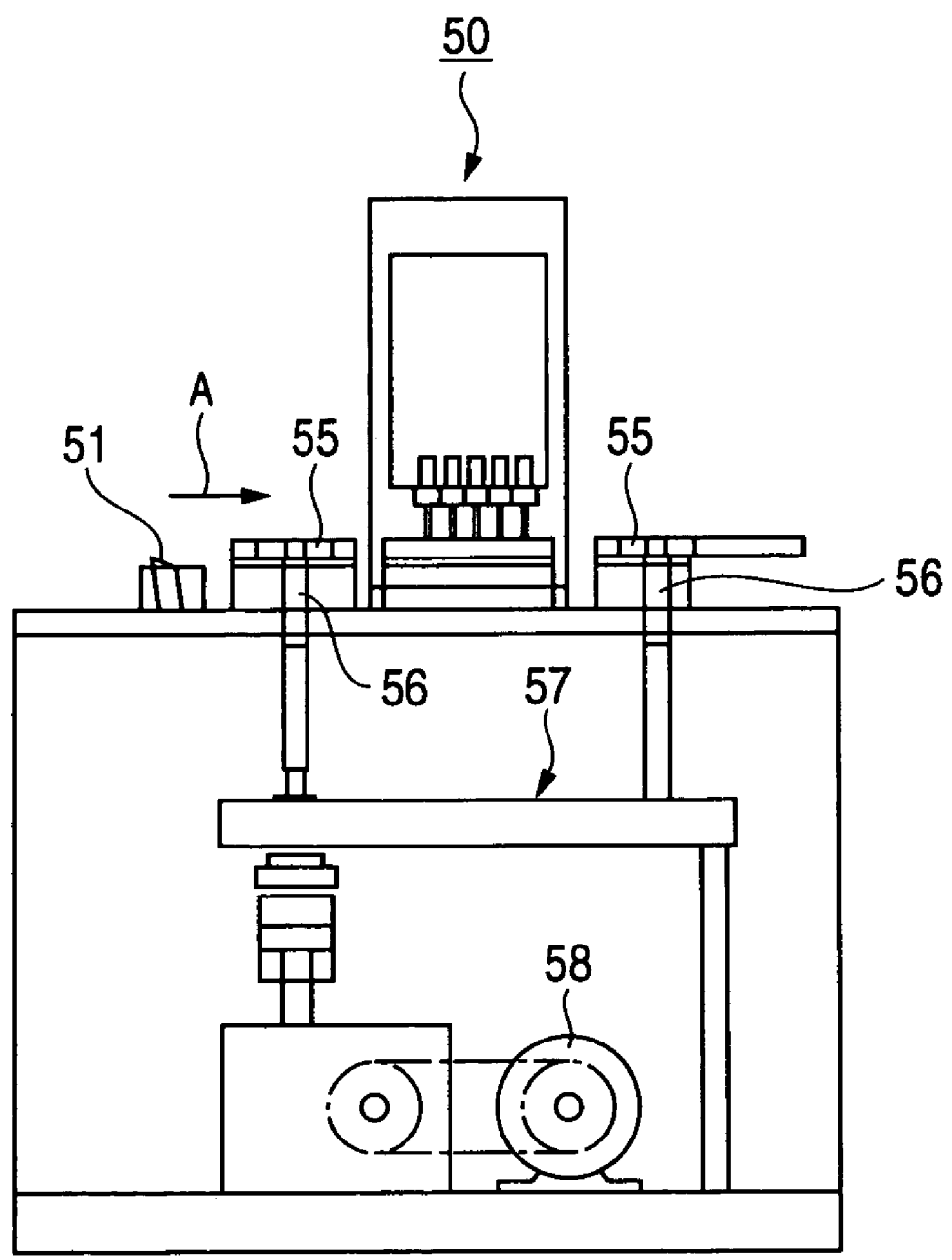
FIG. 10 is a schematic side-elevational view showing an embodiment of a corrugated tube perforating apparatus of the present invention.
Figure 11:
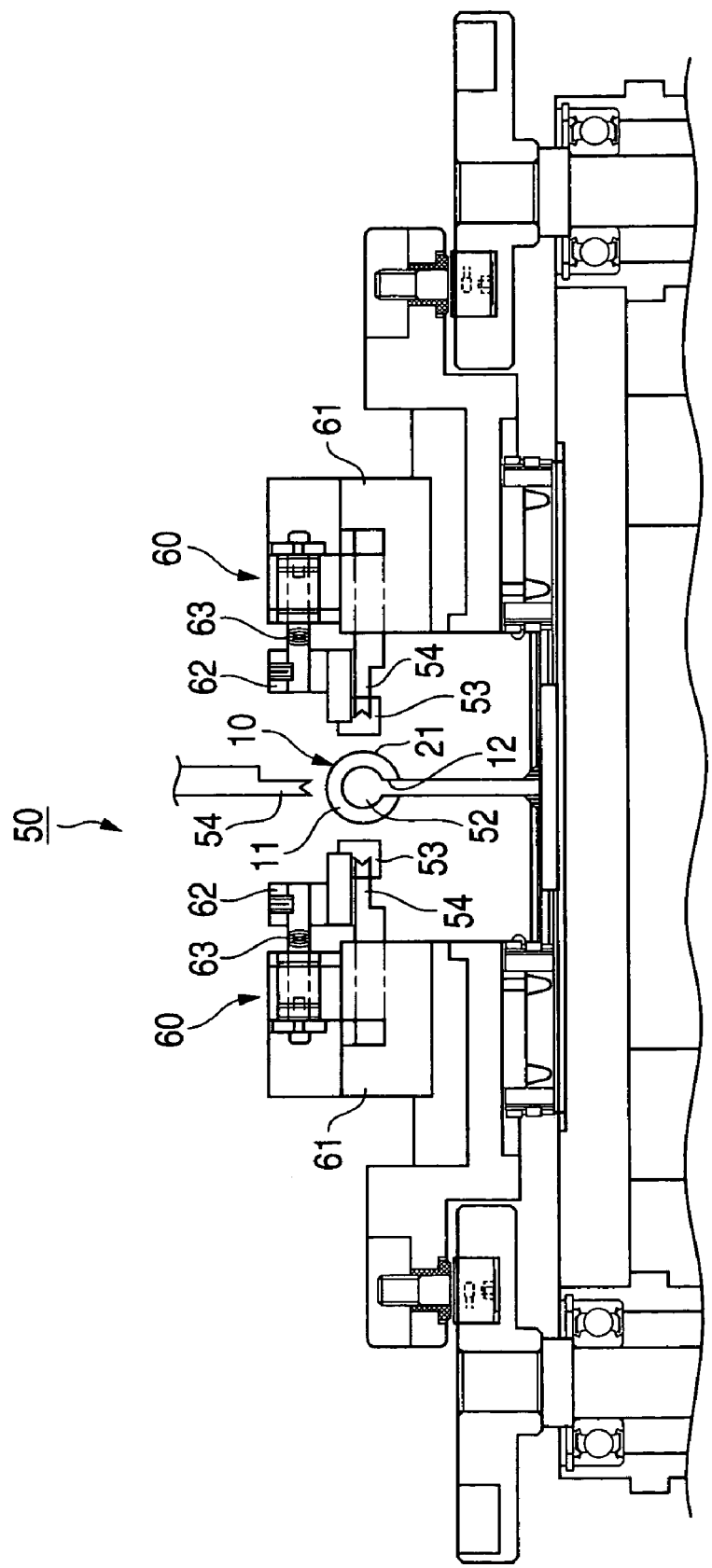
FIG. 11 is a side-elevational view of an important portion of the corrugated tube perforating apparatus of FIG. 10 as seen from a moving direction of a tube body.
Figure 13A:
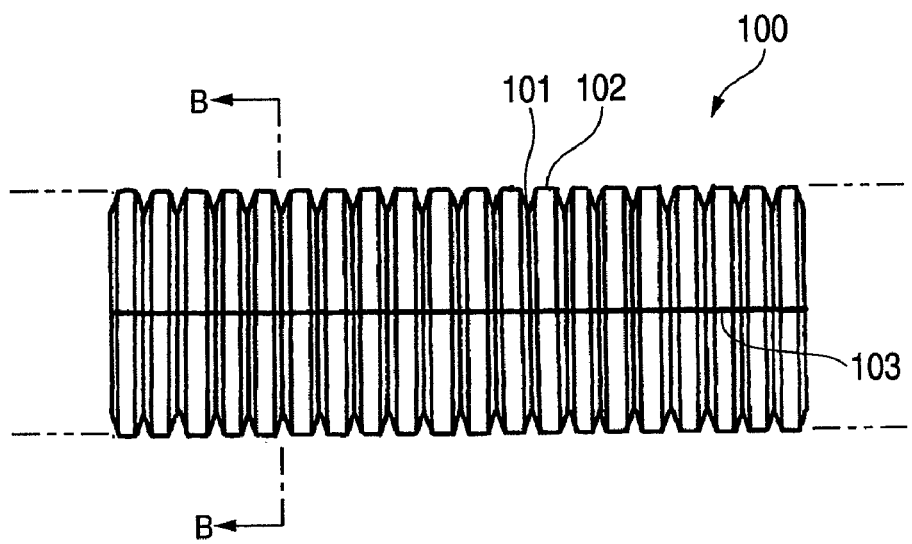
FIG. 13A is a side-elevational view showing a known corrugated tube.
Figure 13B:
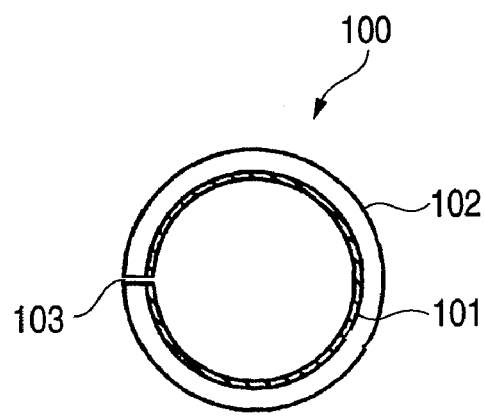
FIG. 13B is a cross-sectional view taken along the position B-B of FIG. 13A.
Figure 14:
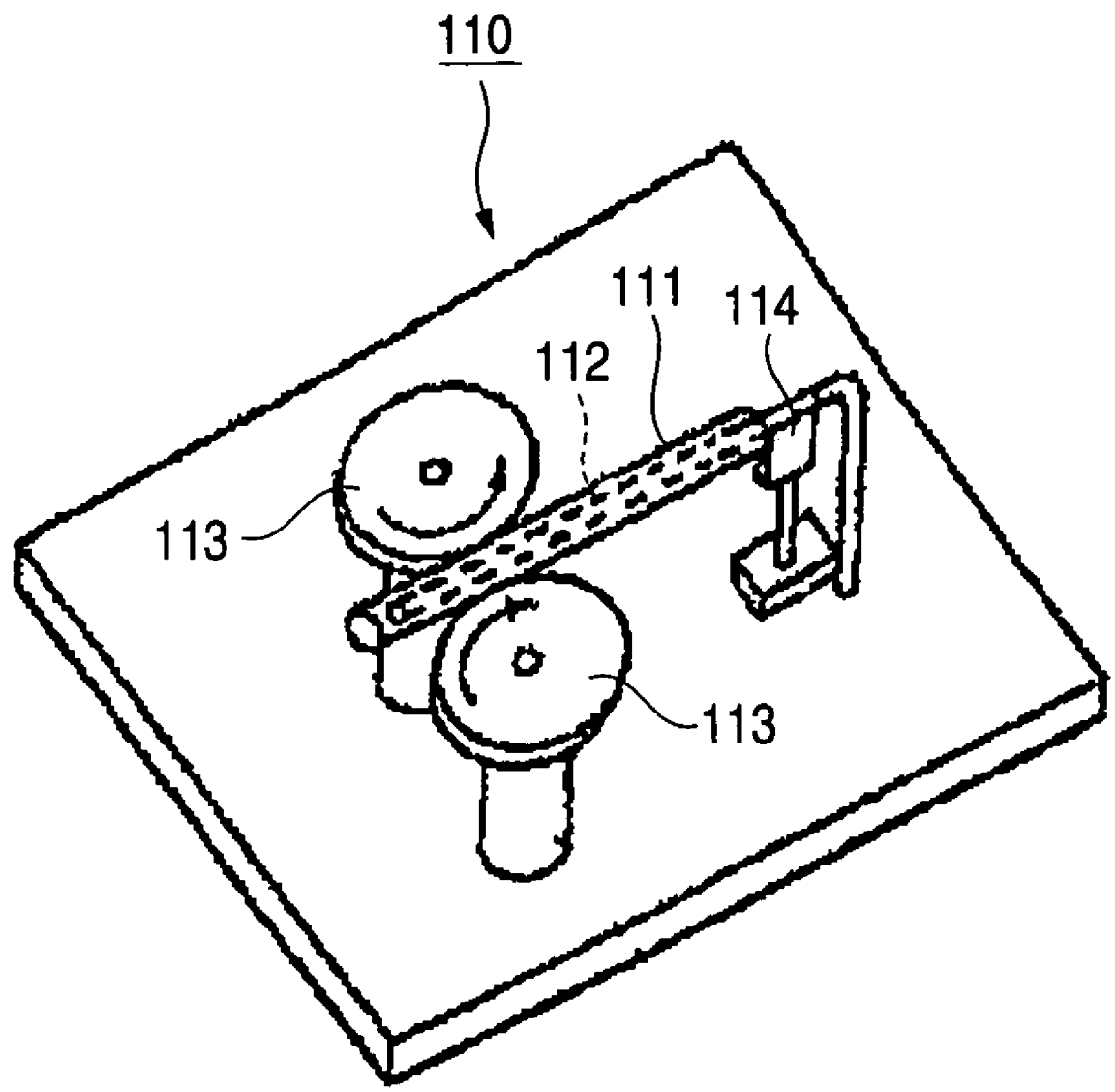
FIG. 14 is a schematic perspective view showing a known tube-slit forming apparatus.

FIG. 10 is a schematic side-elevational view showing an embodiment of a corrugated tube perforating apparatus of the present invention, FIG. 11 is a side-elevational view of an important portion of the corrugated tube perforating apparatus of FIG. 10 as seen from a moving direction of a tube body, and FIG. 12 is a plan view of FIG. 11.

As shown in FIGS. 1 to 2B, the first embodiment of the corrugated tube 10 of the present invention includes the tubular tube body 11 of a circular cross-section having larger-diameter portions 20 defining an outer peripheral surface 21 of the corrugated tube 10, and smaller-diameter portions 30 defining an inner peripheral surface 31, which are arranged alternately along the same axis CL, and a slit 12 which is a cut surface formed along a generating line of the body 11. There are provided vertical wall portions 40 each formed between the larger-diameter portion 20 and the smaller-diameter portion 30 to interconnect the larger-diameter portion 20 and the smaller-diameter portion 30, so that the larger-diameter portions 20 of a trapezoidal cross-section are formed.

The communication holes 13 which communicate the inside and outside of the tube body 11 with each other are formed at least in that portion of the outer peripheral surface 21 of the tube body 11 which is the remotest from the slit 12. FIGS. 1 to 2B show the case where the communication holes 13 are arranged in a row in parallel relation to the slit 12. In this case, the communication holes 13 are formed in that portion of the outer peripheral surface of the corrugated tube 10 which faces away (is spaced 180 degrees) from the slit 13, and is the remotest from the slit 13.

The communication hole 13 is formed by cutting a part of the larger-diameter portion 20 off over a predetermined length L in the circumferential direction. Namely, the outer peripheral surface 21 of the larger-diameter portion 20 and the vertical wall portions 40 are cut off over the predetermined length L along the outer peripheral surface 20. The communication holes 13 are provided at predetermined intervals in the direction of the axis CL of the corrugated tube 10.

Figure 4:
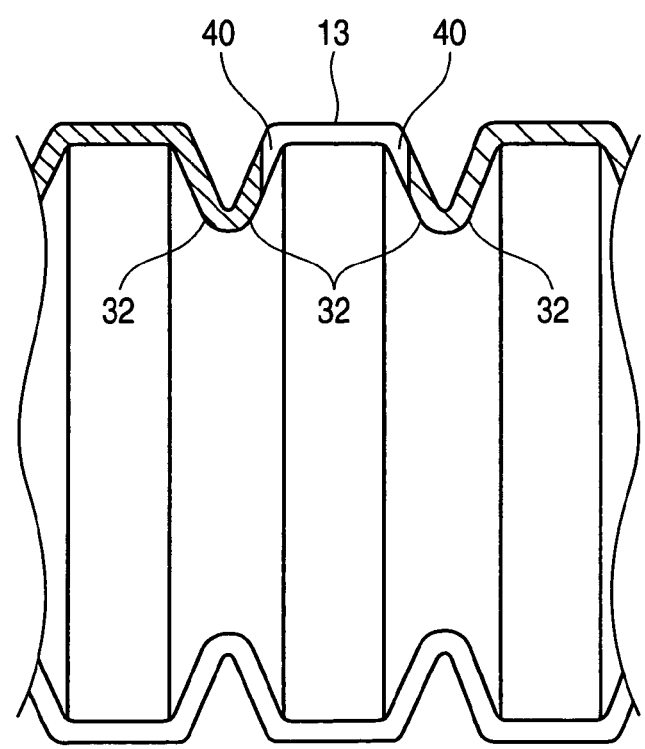
FIG. 4 is a cross-sectional view showing the range of the communication hole.

In FIGS. 2B and 3, although the vertical wall portions 40 are entirely cut off in the direction of the height thereof, the vertical wall portions may be partially cut off as shown in FIG. 4. Namely, the communication hole 13 is formed in such a manner that at least radius portions 32 which are boundary portions each formed between a respective one of the vertical wall portions 40 each interconnecting the larger-diameter portion 20 and the smaller-diameter portion 30 and the smaller-diameter portion 30 remain.

With this construction, the radius portions 32, each defining the boundary portion between the smaller diameter portion 30 and the vertical wall portion 40, remain even at the cut portion defining the communication hole 13, and therefore when a wire or the like is installed within the corrugated tube 10, the wire or the like can be prevented from being damaged.

FIGS. 5A to 7B show examples of arrangements of communication holes 13, in which a plurality of rows of communication holes 13 are formed in the direction of the axis CL of the corrugated tube 10.

When the plurality of rows of communication holes 13 are to be formed, the communication holes 13 are arranged in a staggered manner in the peripheral surface of the tube body 11 when this peripheral surface is shown in a developed view, as shown in FIGS. 5A to 7B. FIG. 5A shows the case where two rows of communication holes 13 are provided, FIGS. 6A and 7A show the cases where three rows of communication holes 13 are provided. When developed views of the tube bodies 11, respectively having these arrangements, are rounded into a tubular shape, the arrangements, shown respectively in FIGS. 5B, 6B and 7B, are obtained.

Namely, in the case where the two rows of communication holes 13 are provided as shown in FIG. 5A, the left and right communication holes 13 are arranged in a staggered (alternate) manner. Usually, the corrugated tube 10 is installed in such a manner that the slit 12 is disposed at a lowermost point so that water intruding into the inside of the corrugated tube 10, condensation water, etc., can be discharged, but there are occasions when the slit 12 can not be disposed at the lower side because of a change of the installation direction. In such a case, in order that any of the communication holes 13 can be located in the vicinity of the lowermost point so as to discharge water, the two rows of communications holes 13, 13 are disposed, for example, in the vicinities of the position remotest from the slit 12 as shown in FIG. 5B.

Next, in the case where the three rows of communication holes 13 are provided as shown in FIG. 6A, the left and right communication holes 13 are arranged in a staggered manner. In this case, the communication holes 13 are arranged at a position opposite to the slit 12 (spaced 180 degrees from the slit 12) which is the remotest position from the slit 12, and at positions between which the remotest position is disposed, for example, the positions at which the left and right communication holes are arranged, correspond to points which equally divide the entire periphery into three. With this arrangement, even when the slit 12 is disposed at the upper side, any of the communication holes 13 can be disposed in the vicinity of the lowermost point.

By arranging the communication holes 13 in a staggered manner as shown in FIGS. 5A to 6B, the strength of the tube body 11 is secured.

Also, the three rows of communication holes 13 can be provided in such a manner that the periphery is equally divided into four at the same pitch P in the circumferential direction as shown in FIGS. 7A and 7B. In this case, the communication holes 13 are provided at a position remotest from the slit 12, and further at each middle position between the remotest position and the slit 12. With this arrangement, even when the slit 12 is disposed at the upper side, any of the communication holes 13 can be disposed in the vicinity of the lowermost point.

By thus uniformly arranging the communication holes 13, the strength of the tube body 11 can be prevented from being reduced.

With respect to the above-mentioned corrugated tubes 10, even if the corrugated tube 10 should be installed in such a manner that the slit 12 is disposed at the upper side, the communication holes 13 are disposed in the vicinity of the lowermost point, and therefore water, intruding into the corrugated tube 10, and condensation water can be discharged.

After a wire harness or the like is received within the corrugated tube 10, the adhesive tape 14 is wound on the outer surface of the corrugated tube as shown in FIG. 8. In such a case, even when the adhesive tape 14 is wound to be disposed over the communication hole 13, the communication hole 13 will not be completely closed as shown in FIG. 9 since the communication hole 13 is formed by cutting part of each vertical wall portion 40 off. Therefore, water can be discharged to the outside through the notched portions of the vertical wall portions 40 forming the communication hole 13.

The corrugated tubes of the present invention are not limited to the above embodiment, and suitable changes, improvements and so on can be made.

Namely, in the above embodiment, although description has been made of the cases where the communication holes 13 are provided in two or three rows, four or more rows of communication holes can be provided. Furthermore, the interval of the communication holes 13 in each row can be suitably determined in accordance with an environment in which the corrugated tube 10 is installed.

Furthermore, the size of the communication holes 13 can be suitably determined, taking the diameter of the tube body, the dischargeability of muddy water, etc., into consideration.

Next, the corrugated tube perforating apparatus 50 for forming a plurality of communication holes 13 in the above-mentioned corrugated tube 10 with the slit 12 will be described with reference to FIGS. 10 to 12.

Referring to FIGS. 10 to 12, in one embodiment of the corrugated tube perforating apparatus 50 of the present invention, a slit 12 is formed in the tube body 11 of the corrugated tube 10 by a slit-forming cutter 51, and thereafter a tube guide 52 is fitted into the tube body 11 and the slit 12 to support the tube body 11 in such a manner that the tube body 11 can not be rotated in the circumferential direction, but can be moved along the tube guide 52. Then, in the corrugated tube perforating apparatus 50, the tube body 11 is retained by a plurality of retainers 53, and in this condition a plurality of communication holes 13 (see FIG. 1) are formed respectively in predetermined portions of an outer peripheral surface 21 of the tube body 11 by a plurality of perforating punches 54.

The slit-forming cutter 51 is provided with a heater, and forms the slit 12 as the tube body 11 of the corrugated tube 10 moves in a direction of arrow A that is shown in FIG. 10 along a generating line of the tube body 11.

The tube guide 52 is provided at a downstream side (at a right side in FIG. 10) of the slit-forming cutter 51 in the moving direction A of the tube body 11 of the corrugated tube 10. The tube guide 52 is fitted in the tube body 11 and the slit 12, and in this condition the tube guide 52 supports the tube body 11 in such a manner the tube body 11 can be moved in the direction A along the generating line.

A pair of tube body feed gears 55 which are disposed respectively at opposite sides of the moving direction A of the tube body 11 at the tube guide 52, are provided at each of the upstream side (the left side in FIG. 10) and downstream side (the right side in FIG. 10) of the perforating punches 54 in the moving direction A of the tube body 11 such that the two pairs of tube body feed gears 55 are provided in all. Each of the tube body feed gears 55 is supported on an upper end portion of a rotation shaft 56 in a generally horizontal condition, and the tube body feed gears abut against the tube body 11 from the opposite sides of the moving direction of the tube body 11 supported on the tube guide 52, and in this condition the tube body feed gears are rotated by a driving force of a motor 58, which is transmitted to the rotation shafts 56 via a transmission mechanism 57, thereby moving the tube body 11 along the tube guide 52.

By the two pairs of tube body feed gears 55 between which the perforating punches 54 are located, the stable feeding can be achieved while taking expansion and contraction, etc., of the tube body 11 of the corrugated tube 10 into consideration.

The perforating punches 54 are driven by cam mechanisms 60 described later, and effect perforating operation for the tube body 11 to form the plurality of communication holes 13 respectively in the predetermined portions of the outer peripheral surface 21 of the tube body 11 of the corrugated tube 10 which is fed in the moving direction A by the tube body feed gears 55.

Namely, the perforating punches 54 are provided in opposed relation to three portions of the outer peripheral surface 21 of the tube body 11 of the corrugated tube 10 spaced about 90 degrees from one another in the circumferential direction except at the portion at which the slit 12 is formed. The perforating punches 54 are arranged in offset relation along the moving direction A of the tube body 11.

Because of the offset arrangement of the perforating punches 54, only one communication hole 13 is formed on the same circumference at the outer peripheral surface 21 of the tube body 11, and a plurality of communication holes 13 will not be formed on the same circumference. Therefore, a local strength decrease of the tube body 11 due to the formation of the communication holes 13 is avoided.

The retainers 53 are driven by the cam mechanisms 60 described later, and effect retaining operation for the tube body 11 of the corrugated tube 10, and before the perforating punches 54 effect the perforating operation, the retainers are caused to abut against the outer peripheral surface 21 of the tube body 11, and retain the tube body 11. The retainers 53 positively position the tube body 11 relative to the perforating punches 54, and enable the perforating punches 54 to positively and highly precisely form the communication holes 13 in the predetermined portions of the outer peripheral surface 21 of the tube body 11 without inviting a position deviation.

By the cam mechanisms 60, the perforating punches 54 and the retainers 53 are driven in a direction generally perpendicular to the moving direction A of the tube body 11, and effect the retaining operation for the tube body 11 of the corrugated tube 10 and the perforating operation for the tube body 11.

Namely, in the cam mechanism 60, a punch drive cam 61 is provided so as to be moved forward and backward along a direction (an upward-downward direction and a left-right direction in FIG. 11) generally perpendicular to the moving direction A of the tube body 11, and the plurality of (five in FIG. 12) perforating punches 54 are fixed to the punch drive cam 61, and are disposed at predetermined intervals along the moving direction A of the tube body 11.

A retainer support portion 62 is supported on the punch drive cam 61 through springs 63 so as to be displaced relative to the punch drive cam, and is disposed above the perforating punches 54. The plurality of (four in FIG. 12) retainers 53 are provided on the retainer support portion 62, and project a predetermined amount beyond the perforating punches 54 toward the tube guide 52, and are disposed at predetermined intervals along the moving direction A of the tube body 11 in such a manner that the retainers 53 and the perforating punches 54 are arranged alternately when viewed from the top (see FIG. 12).

The punch drive cam 61, when advanced toward the tube guide 52 in the direction generally perpendicular to the moving direction A of the tube body 11, brings the retainers 53 into abutment with the outer peripheral surface 21 of the tube body 11 at a required timing before the perforating punches 54 abut against this peripheral surface, so that the tube body 11 is retained by the retainers 53.

When the punch drive cam 61 is further advanced toward the tube guide 52 in the direction generally perpendicular to the moving direction A of the tube body 11, the perforating punches 54 abut respectively against the predetermined portions of the outer peripheral surface 21 of the tube body 11, and form the communication holes 13, respectively. During the perforating operation effected by the perforating punches 54, the retainer support portion 62 is displaced relative to th punch drive cam 61 by contraction of the springs 63, so that the retainers 53 are kept in abutting engagement with the outer peripheral surface 21 of the tube body 11 to retain the same.

The perforating punches 54 and the retainers 53 are moved in an operatively-associated manner by the above cam mechanism 60 which is a simple mechanism, and a sequence of operations, that is, the operation for retaining the tube body 11 by the retainers 53 and the operation for perforating the tube body 11 by the perforating punches 54, are carried out smoothly and positively at the respective required timings.

As described above, in the corrugated tube perforating apparatus 50 of the above embodiment, the tube guide 52 is fitted into the tube body 11 and the slit 12, and by doing so, the tube body 11 is smoothly moved along the tube guide 52 by the tube body feed gears 55 without being rotated in the circumferential direction. And besides, at the time of effecting the perforating operation by the perforating punches 54, the retainers 53, operatively associated with the perforating punches 54 by the cam mechanism 60, positively retain the tube body 11 in the predetermined position. Therefore, the perforating punches 54 can positively and efficiently form the plurality of communication holes 13 respectively in the predetermined portions of the outer peripheral surface 21 of the tube body 11.

Although the present invention has been described in detail with reference to the specific embodiments, it will be clear to those versed in the art that various changes and modifications can be added without departing from the spirits and scope of the present invention.

The present Application is based on Japanese Patent Application (Patent Application No. 2004-058834) filed on Mar. 3, 2004, and Japanese Patent Application (Patent Application No. 2004-126810) filed on Apr. 22, 2004, and contents thereof are incorporated herein as a reference.

The invention claimed is:

1. A corrugated tube including a tube body of a tubular shape having larger-diameter portions and smaller-diameter portions which are arranged alternately along the same axis, and a slit formed along a generating line of the tube body, characterized in that:
   a communication hole, communicating an inside and outside of the tube body with each other, is formed in a peripheral surface of the tube body, and the communicating hole is formed by cutting part of the larger-diameter portion off over a predetermined length in a circumferential direction,
   wherein the communication hole is formed to include a part of each of vertical wall portions each formed between the larger-diameter portion and a respective one of the smaller-diameter portions disposed respectively on opposite sides of the larger-diameter portion in the circumferential direction.

2. The corrugated tube according to claim 1, characterized in that the communication hole is formed at least in a portion of the peripheral surface of the tube body which is remotest from the slit.

3. The corrugated tube according to claim 1, characterized in that a plurality of the communication holes are provided, and the communication holes are arranged in a staggered manner in the peripheral surface of the tube body when the peripheral surface is shown in a developed view.

4. The corrugated tube according to claim 1, characterized in that the communication hole is formed to include a part of a vertical wall portion interconnecting the larger-diameter portion and the smaller-diameter portion.

5. An apparatus for perforating a corrugated tube including a tube body of a tubular shape having larger-diameter portions and smaller-diameter portions which are arranged alternately along the same axis, and a longitudinal slit formed along a generating line of the tube body; characterized in that the apparatus comprises:
   a slit former forming the longitudinal slit in the tube body as the tube body of the corrugated tube is moved along the generating line of the tube body;
   a tube guide which is provided at a downstream side of the slit former in a moving direction of the tube body of the corrugated tube, and is fitted into the tube body and the slit to support the tube body in such a manner that the tube body is movable in a direction along the generating line;
   at least one pair of tube body feeders which are provided at opposite sides of the tube guide in the moving direction of the tube body, and abut against the tube body, supported on the tube guide, from the opposite sides of the tube body in the moving direction, and rotate, thereby moving the tube body along the tube guide; and
   a perforator forming a plurality of communication holes in predetermined portions of a peripheral surface of the tube body which is moved along the tube guide by the tube body feeders.

6. The corrugated tube perforating apparatus according to claim 5, characterized in that the pair of tube body feeders are provided at each of an upstream side and a downstream side of the perforator in the moving direction of the tube body such that the two pairs of tube body feeders are provided in all.

7. The corrugated tube perforating apparatus according to claim 5, characterized in that retainers are provided at the vicinity of the perforator, respectively, and the retainers are brought into abutting engagement with the peripheral surface of the tube body to retain the tube body before perforating operation of the perforator.

8. The corrugated tube perforating apparatus according to claim 7, characterized in that the perforator and the retainers are driven by a cam mechanism.

9. The corrugated tube perforating apparatus according to claim 5, characterized in that the perforators are provided in opposed relation to three portions of the peripheral surface of the tube body of the corrugated tube spaced almost 90 degrees from one another in a circumferential direction, and the three portions do not include a portion at which the slit is formed, and the perforators are arranged in offset relation in the moving direction of the tube body.

10. A method of perforating a corrugated tube including a tube body of a tubular shape having larger-diameter portions and smaller-diameter portions which are arranged alternately along the same axis, and a longitudinal slit formed along a generating line of the tube body; characterized in that the method comprises:
   forming the longitudinal slit in the tube body by a slit former as the tube body of the corrugated tube is moved along the generating line of the tube body;
   fitting a tube guide into the tube body and the slit to support the tube body in such a manner that the tube body is movable in a direction along the generating line;
   moving the tube body along the tube guide by at least one pair of tube body feeders provided at opposite sides of the tube body in a moving direction of the tube body; and
   forming a plurality of communication holes in predetermined portions of a peripheral surface of the tube body by a perforator which is movable in a direction perpendicular to the moving direction of the tube body.

11. The corrugated tube perforating method according to claim 10, characterized in that the tube body feeders abut against the tube body at two regions disposed at an upstream side and a downstream side of the perforator in the moving direction of the tube body, thereby moving the tube body.

* * * * *